Sept. 22, 1925. 1,554,611
A. WEYDELL
CRANK DRESSING TOOL
Filed April 17, 1922 2 Sheets-Sheet 2
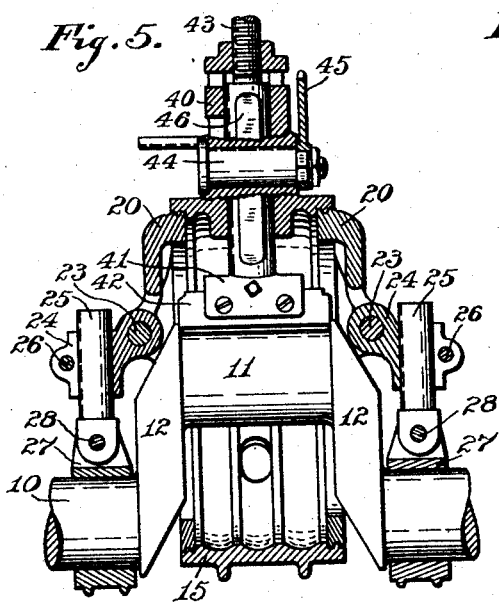
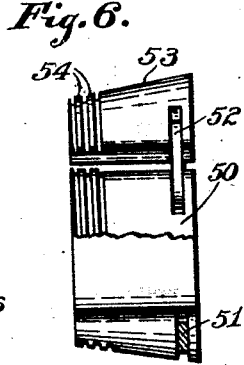
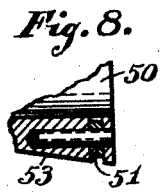
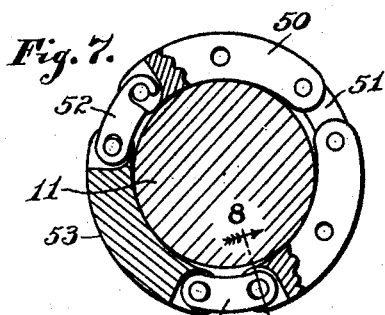
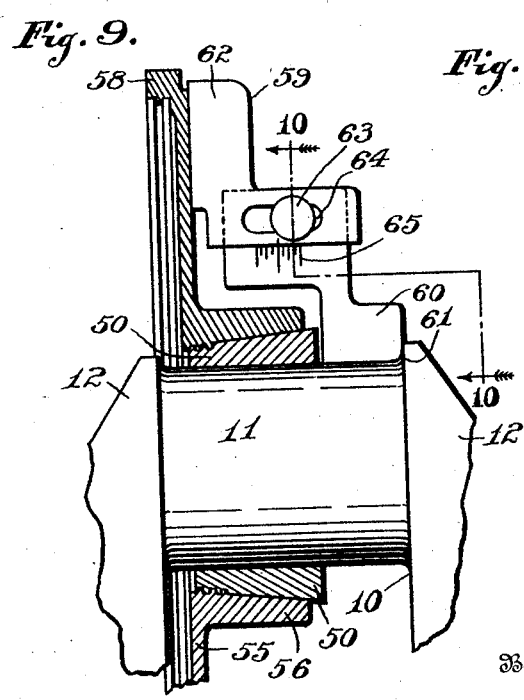
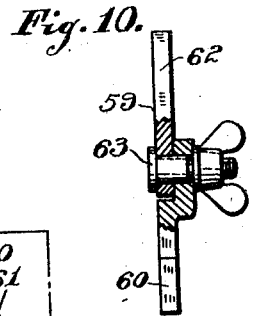
Inventor
Axel Weydell,
G. B. Schley.
By
Attorney Patented Sept. 22, 1925.

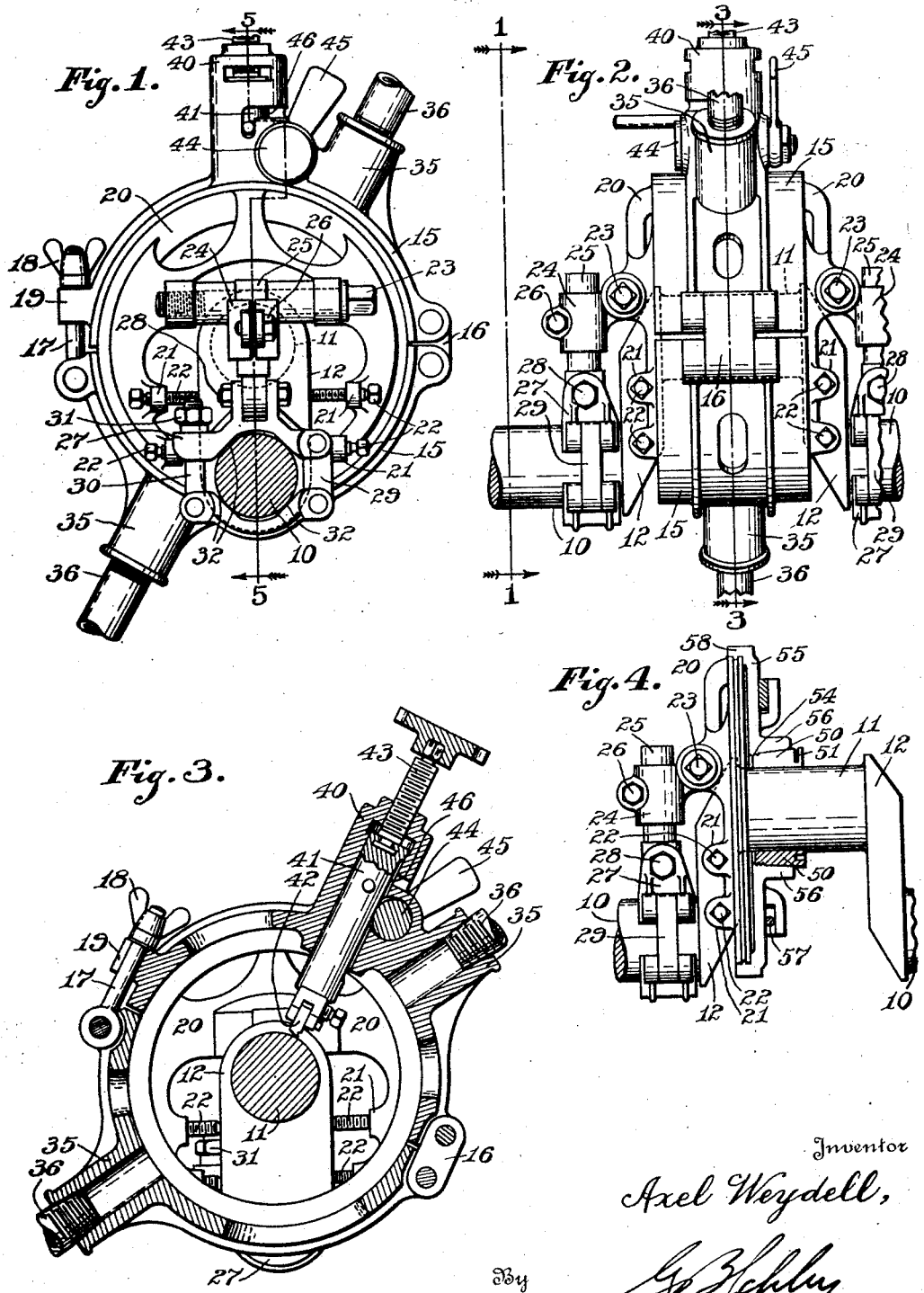

1,554,611

UNITED STATES PATENT OFFICE.

AXEL WEYDELL, OF INDIANAPOLIS, INDIANA.

CRANK-DRESSING TOOL.

Application filed April 17, 1922. Serial No. 554,291.

*To all whom it may concern:*

Be it known that I, AXEL WEYDELL, a subject of the King of Sweden, residing at Indianapolis, in the county of Marion and State of Indiana, have invented a new and useful Crank-Dressing Tool, of which the following is a specification.

It is the object of my invention to provide a simple and convenient tool for dressing cranks of crank-shafts, without the necessity for mouting the crank-shaft on a series of different centers in a lathe.

Heretofore the ordinary way of dressing the crank of a chank-shaft was to put it in a lathe and true it up on each of a plurality of sets of centers, one set for each crank or set of alined cranks, which is an expensive operation; or else to redress the crank by hand with emery cloth, which is very tedious and does not make a round crank.

According to my present invention, I provide a rotatable member, usually manually rotatable, which carries a suitable dressing tool, preferably making the tool adjustable; and I mount this tool-bearing member on supports which are supported from the crank-shaft and throw-arms of the crank, but separately from the crank being dressed; but I provide preliminary adjusting means for adjusting these supports properly with respect to the crank itself which is to be dressed, and after such preliminary adjustment the supports are properly clamped in adjusted position and supported independently of that crank, whereupon the preliminary adjusting means may be removed.

The accompanying drawings illustrate my invention: Fig. 1 is an end elevation of my crank-dressing tool, with the crank-shaft in section substantially on the line 1—1 of Fig. 2; Fig. 2 is a front elevation of such tool; Fig. 3 is a section on the line 3—3 of Fig. 2, with the tool slightly advanced; Fig. 4 is an elevation of a fragment of the crankshaft and one of the supporting elements, with the preliminary adjusting mechanism in section on the crank; Fig. 5 is a section on the line 5—5 of Fig. 1; Fig. 6 is an elevation, in partial section, of the three-split conical ring forming part of the preliminary adjusting means; Fig. 7 is an end elevation of such three-split ring, partly in section, in position on the crank, also shown in section; Fig. 8 is a fragmental section on the line 8—8 of Fig. 7; Fig. 9 is an enlarged fragmental view showing the preliminary adjusting means in position, with a convenient form of calibrating instrument for setting it; and Fig. 10 is a section on the line 10—10 of Fig. 9.

The crank-shaft 10 may have any number of cranks 11, interconnected, or connected to the central shaft proper of the crankshaft by the usual throw-arms 12. The drawings show only a fragment of a crankshaft, with but one crank 11; since my invention relates merely to a dressing tool, and operates on but one crank at a time.

This dressing tool has a rotatable ring 15, formed in two parts (Fig. 1). These two parts are interconnected on one side by a link 16 pivoted to both parts, and on the other side a clamping bolt 17 is pivoted to one of the parts and has a winged nut 18 which cooperates with lugs 19 on the other part to clamp the two parts together. This ring 15 is rotatably mounted on two guide rings 20, one in each end of the ring 15. These guide rings 20 have suitable guiding co-operation with the ring 15, as by interfitting ridges and grooves or shoulders, as is clear from Fig. 5. The guide rings 20 are supported, during operation, entirely independently of the crank being dressed, and wholly upon the crankshaft 10 (or on other cranks when the crank 11 is being dressed if two cranks are directly connected by the same throw-arm 12) and on the throw-arms 12.

For thus supporting the guide rings 20, each guide ring is provided with projecting fingers 21 carrying certain set screws 22 for engaging a throw-arm 12 on its two edge faces. The arrangements shown (Fig. 1) provides two set screws 22 for engaging each edge face of such throw-arm. These set screws are tightened against the cooperating faces of the throw arm to assist in holding the guide rings 20 in proper position, independently of the crank 11.

In addition, each guide ring 20 is pivotally connected by a clamping pivot-bolt 23 transverse to the crank axis to a member 24, in which a round bar 25 is slidable radially of the crank. The member 24 is provided with any suitable means for clamping the slidable bar 25 in desired position within it, as by having the member 24 split and provided with a clamping bolt 26 for clamping it upon the round bar 25. One end of the bar 25 is pivotally connected to a clamping ring 27 by a clamping pivot bolt 28 parallel to the clamping pivot-bolt 23. The clamping ring 27 is made of two parts (Fig. 1) interconnected by a link 29 at one end and provided with a clamping bolt 30 hinged to the other end of one of said members and having a clamping nut 31 which in turn co-operates with the bifurcated end of the other part of the clamping ring 27. By this arrangement the clamping ring 27 may be clamped on the crank-shaft 10 or on some other crank than the one being dressed. The pivotal axes 23, 25, and 28, (for since the member 25 is round it is turnable within the member 24 when unclamped), in connection with the axes of the guide ring 20 and of the clamping ring 27, provide a universal connection of adjustable length between the crank shaft 10 and the guide ring 20, to adjust the device for crank-shafts of different size. The clamping rings 27 are preferably not round internally, but each half of the ring is provided with two flattened parts 32 to provide a V-shaped opening so that the ring will center itself on crank-shafts 10 of different diameters.

The rotatable ring 15 is provided with external sockets 35, for receiving removable arms 36 by which the ring may be turned with a long leverage. As shown, there are two such sockets, but the number of sockets is immaterial.

The rotatable ring 15 also has an outwardly projecting tubular part 40, preferably integral with the ring proper; and in this tubular part 40 is slidably mounted a tool holder 41, which at its inner end carries a dressing cutter 42. The cutter 42 is removably mounted in the tool holder 41, so that tools of different lengths may be placed therein, to correspond with the length of the crank 11 being dressed. The tool holder 41 is adjustable along the tubular part 40, or radially of the crank 11, by an adjusting screw 43 having a suitable mounting in the outer end of said tubular part, and may be clamped in adjusted position by an eccentric clamping member 44 mounted at one side of said tubular part 40 and provided with an operating arm 45 whereby it may be made to clamp against any desired point along a flattened surface 46 on one side of the tool holder 41.

In order to adjust the guide rings 20 concentric with the crank 11 being dressed, I provide a special setting device. A primary setting ring 50, shown in Fig. 6, has three parts connected together by two links 51 and a hook 52, so that by releasing the hook the ring may be put in place around or taken off from the crank 11. The three parts when together form the initial setting ring, which has a conical outer surface 53 provided with a tapered thread 54 at the small end. The inner surfaces of the parts of the ring 50 are segments of cylinders of greater radius than the crank 11 to be dressed, so that they bear on such crank only on lines of tangency, as is clear from Fig. 7; this is to allow for any unevenness which may exist in the crank 11 before dressing. The links 51 are connected to the parts of the ring 50 by pin-and-slot connections, so that they may be used on several sizes of cranks, though for widely different sizes of cranks different rings 50 are provided.

A secondary setting ring 55 has a hub 56 with an internal conical surface for fitting upon the conical outer surface 53 of the primary setting ring 50. The smaller end of this internal conical surface is threaded, to co-operate with the threaded smaller end 54 of the ring 50 to draw the latter tight upon the crank 11 by the screwing together of the rings 50 and 55. This centers the ring 55 on the crank 11 with considerable accuracy, in spite of any lack of trueness of such crank before dressing; as the three parts of the ring 50 move relatively, under the interaction of the two conical surfaces, to adjust themselves concentrically with respect to three lines on the surface of the crank. The ring 55 is preferably made in two parts, for convenience in putting on and taking off, which two parts are clamped together by clamping screws 57 working in bosses projecting from one face of the ring 55. The ring 55 has a peripheral flange 58 projecting from its other face, of proper size and shape to fit upon the surface of the guide rings 20. The clamping screws 57 permit the secondary clamping ring thus to be placed on the rings 20.

In operation, the primary setting ring 50 is placed on the crank 11, and the secondary setting ring 55 then placed on the primary setting ring 50 and upon one of the guide rings 20. At this time, the normal supporting parts for this guide ring 20 are loose. The two setting rings 50 and 55 are screwed together, and located at one end of the crank 11, to a setting determined by a gage 59 such as shown in Figs. 9 and 10. This gage comprises an inner member 60 for bearing against the fillet 61 at the opposite end of the crank 11 from that for which the guide ring 20 is then being set, and an outer member 62 for bearing against the face of the secondary setting ring 55. The two gage members 60 and 62 are connected by a clamping screw 63 passing through a slot 64 in one of the members, and are preferably provided with a suitably marked indicator 65, to indicate the setting to correspond to the length of the crank 11.

When the setting rings 50 and 55 have been properly adjusted by the gage 59, with one of the guide rings 20 within the flange 58 of the secondary setting ring 55, the normal supporting parts for such guide ring 20 are then properly adjusted and clamped upon the throw-arm 12 and crank-shaft 10, or upon the throw arm and another crank when the throw-arm directly connects two cranks. These normal supporting parts comprise the member 24, bar 25, clamping ring 27, and set screws 22. As these parts are clamped into position, the set screws 22 last, they adjust themselves relatively to the guide ring 20, which is held in proper position with the setting rings 50 and 55.

When the normal holding parts have all been firmly set, the setting rings 50 and 55 are removed, reversed in position, and used for setting the other guide ring 20 in the same general manner; and after such setting are again removed. Then the two-part rotatable ring 15 is put in place on the two guide rings 20, the screw 43 is manipulated to bring the cutter 42 into proper dressing position, the clamping member 44 is set to hold the tool holder 41 in this adjusted position, and the rotatable ring is rotated by the arms 36. As this is done, the cutter 42 dresses the outer surface of the crank 11. If necessary, and it usually is necessary, the cutting tool is fed inward during the dressing operation, by suitable manipulation of the operating arm 45 and the adjusting screw 43. When the crank 11 has been completely dressed, the various parts are removed, and used for dressing another crank.

I claim as my invention:

1. A crank-dressing tool, comprising a pair of guide rings provided with means for supporting them from the throw arms and main part of the crank-shaft, a rotatable ring mounted on said guide rings, and an adjustable tool carried by said rotatable ring.

2. A crank-dressing tool, comprising a pair of guide rings provided with means for supporting them from the crank-shaft independently of the crank to be dressed, a rotatable ring mounted on said guide rings, and an adjustable tool carried by said rotatable ring, said guide rings being arranged to prevent relative movement between them and said rotatable ring longitudinally of the crank shaft.

3. A crank-dressing tool, comprising a pair of guide rings provided with means for supporting them from the throw arms and main part of the crank-shaft, a rotatable ring mounted on said guide rings, and a tool carried by said rotatable ring.

4. A crank-dressing tool, comprising a pair of guide rings provided with means for supporting them from the crank-shaft independently of the crank to be dressed, a rotatable ring mounted on said guide rings, and a tool carried by said rotatable ring, said guide rings being arranged to prevent relative movement between them and said rotatable ring longitudinally of the crank shaft.

5. A crank-dressing tool, comprising a pair of guide rings provided with means for supporting them from the crank-shaft independently of the crank to be dressed, a rotatable ring mounted on said guide ring, a tool carried by said rotatable ring, and setting means mountable on the crank being dressed and arranged to co-operate with the guide rings to set the latter concentric with such crank.

6. A crank-dressing tool, comprising a pair of guide rings, clamping means for mounting upon the crank shaft independently of the crank to be dressed, universally adjustable means connecting said guide rings to said clamping means, and a rotatable tool carrier mounted on said guide rings.

7. A crank-dressing tool, comprising a pair of guide rings, clamping means for mounting upon the crank shaft independently of the crank to be dressed, adjustable means connecting said guide rings to said clamping means, and a rotatable tool carrier mounted on said guide rings.

8. A crank-dressing tool, comprising a pair of guide rings, clamping means for mounting upon the crank shaft independently of the crank to be dressed, adjustable means connecting said guide rings to said clamping means, said guide rings being provided with clamping means for co-operating with the throw-arms of the crank being dressed to assist in holding the guide rings in proper position, and a rotatable tool carrier mounted on said guide rings.

9. A crank-dressing tool, comprising a pair of guide rings, means for supporting said guide rings from the crank shaft independently of the crank to be dressed, setting means settable upon the crank to be dressed, and a rotatable ring carrying a dressing tool, said rotatable ring and said setting means being interchangeably co-operable with said guide rings.

10. A crank-dressing tool, comprising a rotatable ring, a support therefor on which said rotatable ring is slidably mounted, means for carrying said support from said crank shaft independently of the crank to be dressed, and setting means removably co-operable with said crank to be dressed for co-operating with said support to determine the set thereof.

11. A crank-dressing tool, comprising a pair of guide rings, means for supporting said guide rings for the crank shaft independently of the crank to be dressed, a rotatable member removably mountable upon said guide rings and provided with a tool for dressing said crank, a primary setting ring having three interconnecting parts for mounting upon said crank to be dressed, and a secondary setting ring having two interconnecting parts for mounting upon the primary setting ring, said secondary setting ring being provided with a part for settingly co-operating with said guide rings interchangeably with said rotatable member.

12. A crank-dressing tool, comprising a pair of guide rings, means for supporting said guide rings from the crank shaft independently of the crank to be dressed, a rotatable member removably mountable upon said guide rings and provided with a tool for dressing said crank, a primary setting ring having three interconnecting parts for mounting upon said crank to be dressed, and a secondary setting ring having two interconnecting parts for mounting upon the primary setting ring, said secondary setting ring being provided with a part for settingly co-operating with said guide rings.

13. A crank-dressing tool, comprising a pair of guide rings, means for supporting said guide rings from the crank shaft independently of the crank to be dressed, a rotatable member removably mountable upon said guide rings and provided with a tool for dressing said crank, a primary setting ring having a plurality of interconnecting parts for mounting upon said crank to be dressed, and a secondary setting ring having a plurality of interconnecting parts for mounting upon the primary setting ring, said secondary setting ring being provided with a part for settingly co-operating with said guide rings interchangeably with said rotatable member.

14. A crank-dressing tool, comprising a pair of guide rings, means for supporting said guide rings from the crank shaft independently of the crank to be dressed, a rotatable member removably mountable upon said guide rings and provided with a tool for dressing said crank, a primary setting ring having a plurality of interconnecting parts for mounting upon said crank to be dressed, and a secondary setting ring having a plurality of interconnecting parts for mounting upon the primary setting ring, said secondary setting ring being provided with a part for settingly co-operating with said guide rings.

15. A crank-dressing tool, comprising a pair of guide rings, means for supporting said guide rings from the crank shaft independently of the crank to be dressed, a rotatable member removably mountable upon said guide rings and provided with a tool for dressing said crank, a primary setting ring having a plurality of interconnecting parts for mounting upon said crank to be dressed, and a secondary setting ring having a plurality of interconnecting parts for mounting upon the primary setting ring, said secondary setting ring being provided with a part for settingly co-operating with said guide rings, said two setting rings co-operating on mating conical surfaces.

16. A crank-dressing tool, comprising a pair of guide rings, means for supporting said guide rings from the crank shaft independently of the crank to be dressed, a rotatable member removably mountable upon said guide rings and provided with a tool for dressing said crank, a primary setting ring having a plurality of interconnecting parts for mounting upon said crank to be dressed, and a secondary setting ring having a plurality of interconnecting parts for mounting upon the primary setting ring, said secondary setting ring being provided with a part for settingly co-operating with said guide rings, said two setting rings co-operating on mating conical surfaces and being provided with threads for drawing one tightly upon the other.

17. A crank-dressing tool, comprising a pair of guide rings, means for supporting said guide rings from the crank shaft independently of the crank to be dressed, a rotatable member removably mountable upon said guide rings and provided with a tool for dressing said crank, a primary setting ring having a plurality of interconnecting parts for mounting upon said crank to be dressed, and a secondary setting ring having a plurality of interconnecting parts for mounting upon the primary setting ring, said secondary setting ring being provided with a part for settingly co-operating with said guide rings, said two setting rings co-operating on mating conical surfaces and being provided with threads for drawing one tightly upon the other, the number of parts of said two rings being different.

In witness whereof, I have hereunto set my hand at Indianapolis, Indiana, this 12th day of April, A. D. one thousand nine hundred and twenty-two.

AXEL WEYDELL.